United States Patent [19]

Bompard et al.

[11] 4,437,221

[45] Mar. 20, 1984

[54] PROCESS FOR INSERTING POINTS IN A MANDREL

[75] Inventors: Bruno Bompard; Alain Bruyere, both of Lyons, France

[73] Assignees: Commissariat A L'Energie Atomique, Paris; Societe J. Brochier & Fils, Villeurbanne, both of France

[21] Appl. No.: 326,755

[22] Filed: Dec. 2, 1981

[30] Foreign Application Priority Data

Jul. 16, 1981 [FR] France .................................. 81 13868

[51] Int. Cl.³ .............................................. B23P 19/00
[52] U.S. Cl. .................................... 29/429; 29/33 K; 29/458; 29/790; 300/3; 300/21
[58] Field of Search .............. 29/429, 790, 430, 432.1, 29/432, 33 K, 458; 300/3, 21

[56] References Cited

U.S. PATENT DOCUMENTS

| | | | |
|---|---|---|---|
| 2,171,388 | 8/1939 | Berger | 29/432.1 |
| 2,244,073 | 6/1941 | Lyon | 29/432.1 |
| 2,972,789 | 2/1961 | Mathues | 29/429 UX |
| 3,581,378 | 6/1971 | Jozens | 29/429 |
| 3,727,294 | 4/1973 | Caller | 29/429 |
| 3,948,616 | 4/1976 | Gardner | 29/429 |

*Primary Examiner*—Charlie T. Moon
*Attorney, Agent, or Firm*—Kerkam, Stowell, Kondracki, & Clarke

[57] ABSTRACT

A process for inserting points (38) on a mandrel (36) and a machine for performing this process. A working head (40) simultaneously ensures the insertion of a point and the making of a perforation (112) in the mandrel by means of a punch (94). The perforation is made in the same longitudinal row as the inserted point and towards the front with respect to the latter, in such a way that it is subsequently possible to guide a point following a rotation of one or more turns of the mandrel. The invention is applicable to the production of members or bodies of revolution made from three-dimensional material.

4 Claims, 7 Drawing Figures

PROCESS FOR INSERTING POINTS IN A MANDREL

BACKGROUND OF THE INVENTION

The present invention relates to a process for inserting points in a supporting mandrel made from a material able to receive the points by direct insertion under pressure, in order to form rows of points aligned in accordance with the generatrixes of the mandrel, as well as to a machine for performing this process.

In the production of bodies or members of revolutions made from three-dimensional material, it has already been proposed, more particularly in French Pat. No. 2,408,676, filed on Sept. 23, 1977 in the name of the Commissariat a l'Energie Atomique, to insert points in a mandrel so as to define between the said points longitudinal and circumferential passages and arranging in the latter, by winding and weaving, layers of superimposed wires, followed by the densification of the thus obtained assembly, e.g. by means of a thermosetting resin and finally the removal of the supporting mandrel. The thus obtained body or member comprises three rows of layers arranged in accordance with three preferred directions, which are optionally perpendicular to one another, the density of the wires in each of the three directions being as high as required. It is in this way possible to obtain a body of revolution made from a very thick three-dimensional material if the length of the points is adequate to permit the superimposing of numerous layers of wires on the mandrel by winding and weaving.

The principle of installing the wires in a substantially radial direction by the placing of pins on a mandrel covered with an easily penetrable layer and which can be removed after the layers of wires have been formed in two other directions is known from U.S. Pat. No. 3,577,294. However, in the latter the points are inserted by means of an air gap or the like which leads to a particularly imprecise insertion thereof. Thus, as soon as the density and particularly the length of the points increases, it becomes virtually impossible to produce layers of wires in two other directions as a result of the intersecting of the points. This is confirmed by the text of the aforementioned U.S. Patent, which clearly states that the points must be short and compares the structure of the mandrel after their insertion to that of velvet.

The aforementioned French Pat. No. 2,408,676 has already proposed a process and a machine using this principle. However, although the machine described therein is more accurate and therefore permits a finer insertion of the points to the mandrel, it still has certain technical limitations due to the fact that the distance between the surface to which the insertion is to be made and the guidance means of the points is entirely dependent on the length of the points to be inserted.

In the case of thick, three-dimensional pieces, in order to be able to carry out winding and weaving under normal conditions, the quality of the insertion of the points to the mandrel must be perfect. Thus, the fitted points must be perfectly aligned in accordance with the axis or in accordance with the circumference. This quality can only be obtained to the extent that the means used are very accurate. Thus, on considering a three-dimensional part, whose axial spacing is 3 mm, with a point length of 200 mm and a point diameter of 1 mm, a slight point deviation of 0°34′ during insertion would lead to the tips of the points touching, so that it would then be impossible to wind the same.

A critical analysis of the aforementioned processes and particularly that of French Pat. No. 2,408,676 of Sept. 23, 1977 reveals certain technical deficiencies or inadequacies. Thus, during its insertion in the foam the point must make room. Irregularities in the foam (bubbles, higher density, hard particles, etc) tend to deflect the point. Sectional and cross-sectional irregularities (point with a fibrous or bevelled cross-section) lead to faulty alignments of the points. Finally, surface irregularities (chips, protuberances, etc) damage the foam and overdimension the holes during the insertion process. The points then tend to drop very easily.

In addition, the straightness quality of the point must be increasingly high as the distance between the foam surface and the guidance members increases. The points, which are generally obtained from prepolymerized fibrous elements, have a slight prejudicial sag when the length reaches 50 mm or higher. With respect to the model made in the foam, insertion using such points is subject to serious irregularities. To obviate this deficiency, it is necessary to guide the point very accurately and design guidance means such that they do not prejudice the rest of the production cycle.

For the various reasons referred to hereinbefore, it is at present virtually impossible when using known processes to produce objects of revolution made from three-dimensional material having a thickness greater than 50 mm. However, for numerous insertions, it is desirable to have a process and a machine making it possible to insert points having a considerable length on a mandrel in order to subsequently produce objects of revolution made from a three-dimensional material having a significantly greater thickness and which can in fact reach 150 mm.

BRIEF SUMMARY OF THE INVENTION

The present invention relates to a process for the insertion of points on a supporting mandrel making it possible to insert point having a considerable length (greater than 50 mm) with an adequate accuracy so as not to impede the subsequent fitting of layers of superimposed wires in the passages defined between the points. The invention also relates to a machine for performing this process.

To this end, the present invention proposes a process for the insertion of points to a supporting mandrel made at least in part from a material able to receive the points by direct insertion under pressure in order to form rows of points aligned in accordance with the generatrixes of the mandrel, wherein it comprises rotating step by step the supporting mandrel, simultaneously making by means of a single working head a perforation for receiving a point and the insertion of a point in a perforation made beforehand in the same row and producing a given relative displacement parallel to the closest generatrix of the mandrel between the working head and the mandrel, at least once every complete revolution of the mandrel.

It is clear that the formation beforehand of a perforation in the mandrel makes it possible to ensure both effective holding and guidance of the point during its insertion. Moreover, due to the fact that the points are inserted and the perforations made simultaneously by means of a single working head, it is certain that the point to be inserted is perfectly in front of the perforation when inserted in the mandrel and without impairing the production cycle. All these characteristics lead to a marked improvement in the hold, positioning and guidance of the points during their insertion. Thus, the insertion quality is markedly improved compared with the prior art processes. Therefore, points of considerable length can be inserted without difficulty.

A two-phase insertion process has been investigated for the case when it is desired to insert points in a solid, hard support of a metallic nature, which subsequently has to resist high winding pressures, as well as certain thermal shocks. For this purpose, a preferably two-layer mandrel has been produced, which is formed by a metal ring in which, for example, foam has been expanded. Before carrying out the insertion, a pre-hole is made at least in the metal layer. Once this operation has been completed, the completion of the perforation process and the insertion of the points according to the inventive process are performed simultaneously. As a result of its metal ring, such a mandrel has the physical characteristics required for the subsequent weaving and processing operations, whilst the presence of the foam ensures a good hold of the points during their insertion. However, the direct solution of simultaneous perforation and insertion in the untreated foam is preferred to this longer and more onerous embodiment.

With the aim of improving the insertion quality of the points, the perforations are preferably made over a depth at least equal to the length of the part of the points to be inserted in the mandrel, the diameter of the perforations being substantially equal to that of the points.

The invention also relates to a machine for inserting points in a supporting mandrel made from a material able to receive the points by direct insertion under pressure, in order to form rows of points aligned in accordance with the generatrixes of the mandrel, said machine comprising means for supporting the mandrel in rotary manner, means for rotating the mandrel step by step about its axis, a working head carrying the means for inserting the points in the mandrel and means for carrying out a given relative displacement parallel to the closest generatrix of the mandrel between the working head and the mandrel, wherein the working head also carries a punch located in the same row as the point to be inserted and displaced by at least a distance equal to the spacing being defined by two successive points in the same row and towards the front with respect to said point in the displacement direction of the working head, the means for inserting the point simultaneously acting on the punch to bring about a prior perforation of the mandrel.

According to a preferred embodiment of the invention, the guidance head comprises a guidance member flush with the outer surface of the mandrel and having a first guidance hole which receives the punch and a second guidance hole which receives the point to be inserted, the wall of the second guidance hole being formed on a movable door to the rear of the guidance head in the mandrel rotation direction, appropriate control means opening the said door following the insertion of a point in order to permit the rotation of the latter with the mandrel and closing said door following said rotation.

According to another feature of the invention, the means for inserting the points comprise a first part moving in accordance with a direction parallel to the guidance holes formed in the guidance member and positioned above the latter, the first part bearing during its displacement on a second part supporting the punch and carrying an insertion rod which bears on the point to be inserted. A point-carrying drum provided with regularly spaced recesses for receiving the points is positioned between the first moving part and the guidance member, said drum being supplied with points by a vertical supply tube integral with the first part and means are provided for rotating the drum by a given angle corresponding to the space separating two recesses whenever a point has been inserted in the mandrel.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
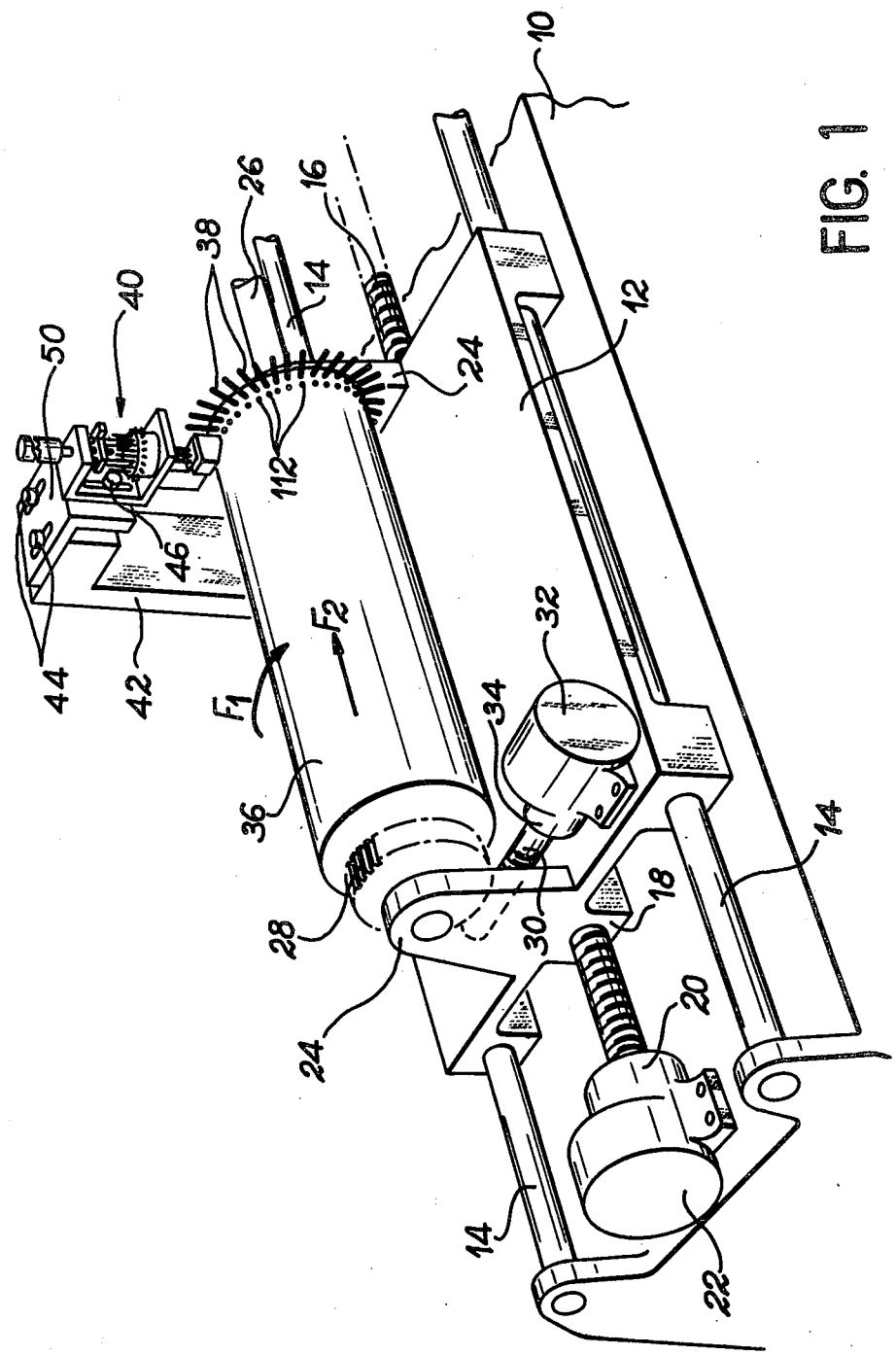
FIG. 1 a diagrammatic perspective view of the machine for inserting points in a mandrel according to the invention.

As can be seen in FIG. 1, the machine according to the invention comprises a substantially horizontal table 10 above which can move an also horizontal support plate 12. More specifically, support plate 12 is guided by two parallel posts 14 carried by table 10. Moreover, support plate 12 can move along these posts as a result of the cooperation of an also horizontal endless screw 16, which is parallel to posts 14, with an appropriate thread formed in a yoke 18 integral with plate 12. Endless screw 16 is rotated via a reduction gear 20 by a stepping motor 22 fixed to table 10. At each of its ends, support plate 12 carries an arm 24, which projects upwards and in rotation supports a horizontal shaft 26, whose axis is also parallel to those of posts 14 and of endless screw 16. Shaft 26 is fixed to a pinion 28, which meshes with an endless screw 30, whose rotation is controlled by a stepping motor 32 via a reduction gear 34. Motor 32 is fixed to support plate 12.

Between arms 24, shaft 26 also supports a supporting mandrel 36 in which, according to the present invention, are inserted rigid plate points. As has been stated hereinbefore, the outer shape of mandrel 36 defines the inner envelope of the body of revolution to be produced. Thus, for example, in FIG. 1 the mandrel is cylindrical making it possible to produce a body of revolution having a cylindrical recess.

In per se known manner, mandrel 36 is made from a material which is sufficiently rigid to support the pins and sufficiently flexible to permit the insertion of the latter without requiring excessive force. However, according to the present invention, the production of the perforations beforehand in the mandrel makes it possible to use a less flexible material than in the prior art and this contributes to an improvement in the hold of the points, as will be shown hereinafter. Preferably, the mandrel is made by using a rigid foam of the type known in the art as phenolic foam or polyurethane foam. As stated hereinbefore, the mandrel can either be entirely made from foam or can firstly comprise an outer layer made from a hard and in particular metallic material, which is filled with foam. In the latter case, which makes it possible to give the mandrel a good mechanical strength, it is necessary to make perforations beforehand, which at least pass through the outer layer.

As a result of the combination of the movements obtained by motors 22 and 32, respectively ensuring a displacement of mandrel 36 parallel to its axis and a rotation of the mandrel on itself, it is apparent that it is possible to move the entire surface of the mandrel beneath a random fixed point in space and in this way, by controlling these two stepping motors to insert in the mandrel a series of points, either in helical form if each operation of motor 32 is accompanied by an operation of motor 22, or in the form of regularly spaced circles if the operation of motor 22 only takes place once during a rotation of one turn of mandrel 36. In both cases, the spacing of the thus inserted points can be regulated at random by acting on motors 32 and 22.

The insertion of the points and, according to the invention, the formation of the prior perforations 112 take place by means of a working head 40 mounted on the vertical branch of an angle bracket 50 by means of an adjusting screw 46. The horizontal branch of angle bracket 50 is itself mounted on a vertical support 42 by means of adjusting screw 44. Support 42 is integral with table 10. Thus, working head 40 can be positioned vertically above mandrel 36, in the manner illustrated in FIG. 1, by acting on screws 44 and 46.

Figure 2:
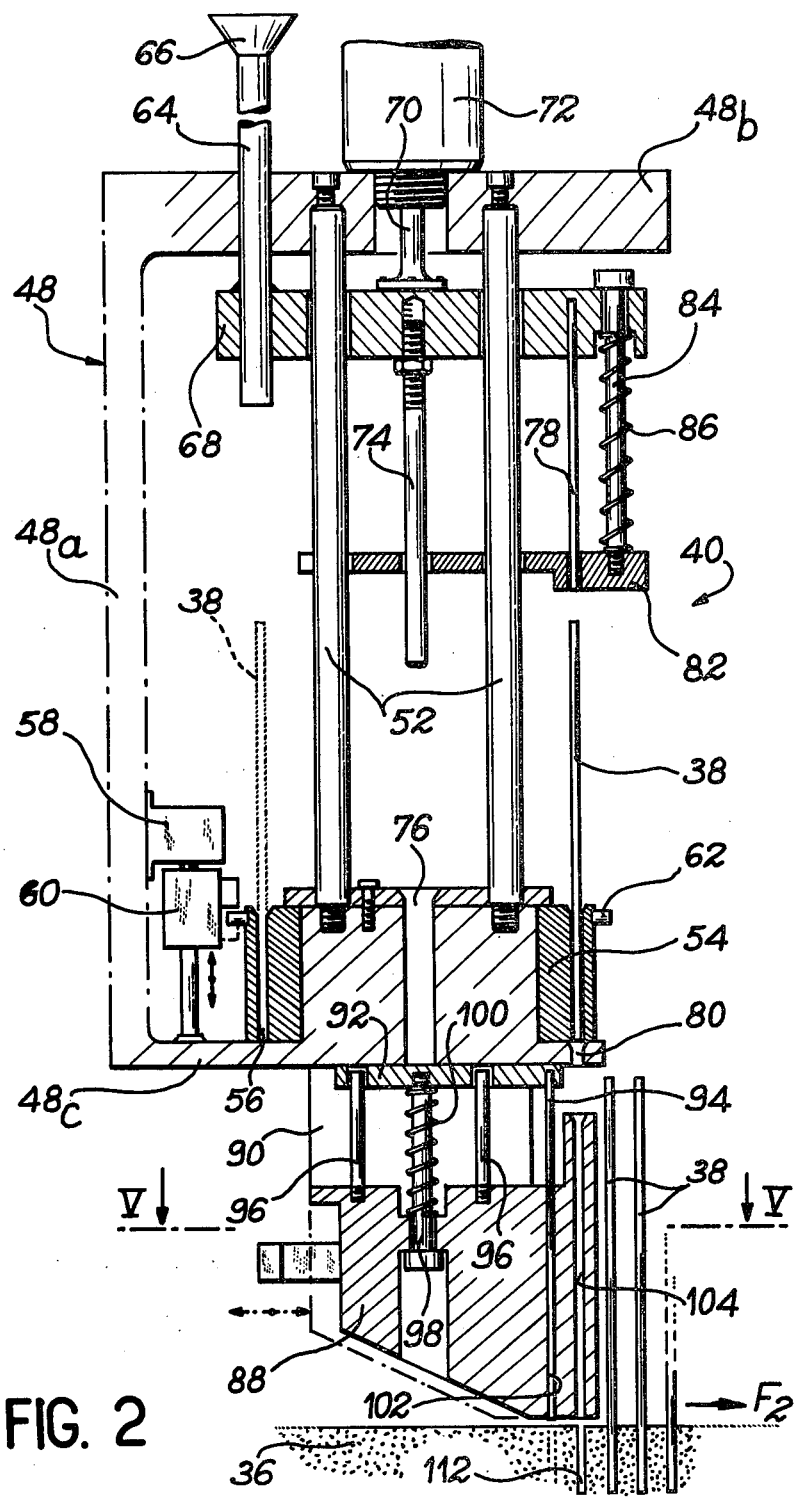
FIG. 2 a sectional view, along a plane containing the mandrel axis, of the working head of the machine of FIG. 1.

The working head 40 will be described in greater detail hereinafter with reference to FIG. 2. As is illustrated in FIG. 2, the working head 40 comprises a U-shaped supporting part 48, whose intermediate branch 48a is vertical and is fixed by screws 46 to angle bracket 50 and whose upper and lower horizontal end branches 48b, 48c respectively support between them vertical guidance columns 52. The upper part of the lower branch 48c forms a vertical shaft about which is received a rotary drum 54 provided, in the manner illustrated more particularly in FIG. 4, with a certain number of vertical recesses or holes, regularly distributed over its circumference. The stepwise rotation of drum 54 is controlled by a jack 58 fixed to support 48 and moving alternatively from top to bottom and bottom to top a member 60 provided with appropriate cam surfaces, which cooperate with radial rods 62 carried by drum 54, so as to rotate the latter by a value corresponding to the spacing separating two adjacent holes 56 during the operation of motor 58. Holes 56 receive points 38 by a vertical supply tube 64 terminated at its upper end by a funnel 66 into which the points are introduced by per se known means.

Supply tube 64 is fixed to a member constituted by a horizontal plate 68 able to move along columns 52. More specifically, plate 68 is fixed to the lower end of rod 70 of a pneumatic jack 72 supported by the upper branch 48b of member 48. In the extension of rod 70, plate 68 carries a vertical pin 74, which projects downwards over an adequate length to traverse a hole 76 formed in lower branch 48c when plate 68 is in the low position, as will be shown hereinafter. Plate 68 also carries a vertical insertion punch or rod 78, which also projects downwards and is positioned in front of one of the points 38 carried by drum 54. More specifically, rod 78 is positioned in front of a point 38, which faces a hole 80 in the lower branch 48c of member 48. Rod 78, whose diameter is substantially equal to that of the points, is guided by means of an intermediate horizontal plate 82 fixed to a vertical screw 84 traversing plate 68 and drawn downwards whilst moving away from the latter by means of a spring 86.

A guidance member 88, which is preferably flush with the outer surface of mandrel 36, as shown in FIG. 2, is fixed below the lower branch 48c. Member 88 has below the lower branch 48c a recess 90 which receives a moving part constituted by a horizontal plate 92 supporting a punch 94. Plate 92 is guided by means of vertical columns 96 fixed between part 88 and branch 48c. Moreover, a screw 98 projects downwards from plate 92 through part 88. A spring 100 mounted on screw 98 between part 80 and plate 92 draws the latter upwards into the position shown in FIG. 2.

Punch 94 is fixed to plate 92 and traverses a first vertical guidance hole 102 formed in guidance part 88. More specifically, when the plate 92 is in its upper position, the end of punch 94 is flush with the lower end of part 88. The latter also has a second vertical guidance hole 104 aligned with the hole 80 for supplying points 38, so as to effectively guide the latter during their insertion. As can be more particularly gathered from FIG. 5, working head 40 is positioned in such a way that the axes of guidance holes 102 and 104 are placed in the vertical plane passing through axis X—X of mandrel 36. Moreover, the axes of holes 102 and 104 are displaced from one another by a distance corresponding to an integral number of times the distance or spacing separating two successive points of the same longitudinal row on the mandrel, the guidance hole 102 of punch 94 being placed in front of guidance hole 104 for the points with respect to the insertion direction of the latter. In the represented embodiment, this distance is equal to the spacing defined by the points 38 of the same longitudinal row.

Figure 4:
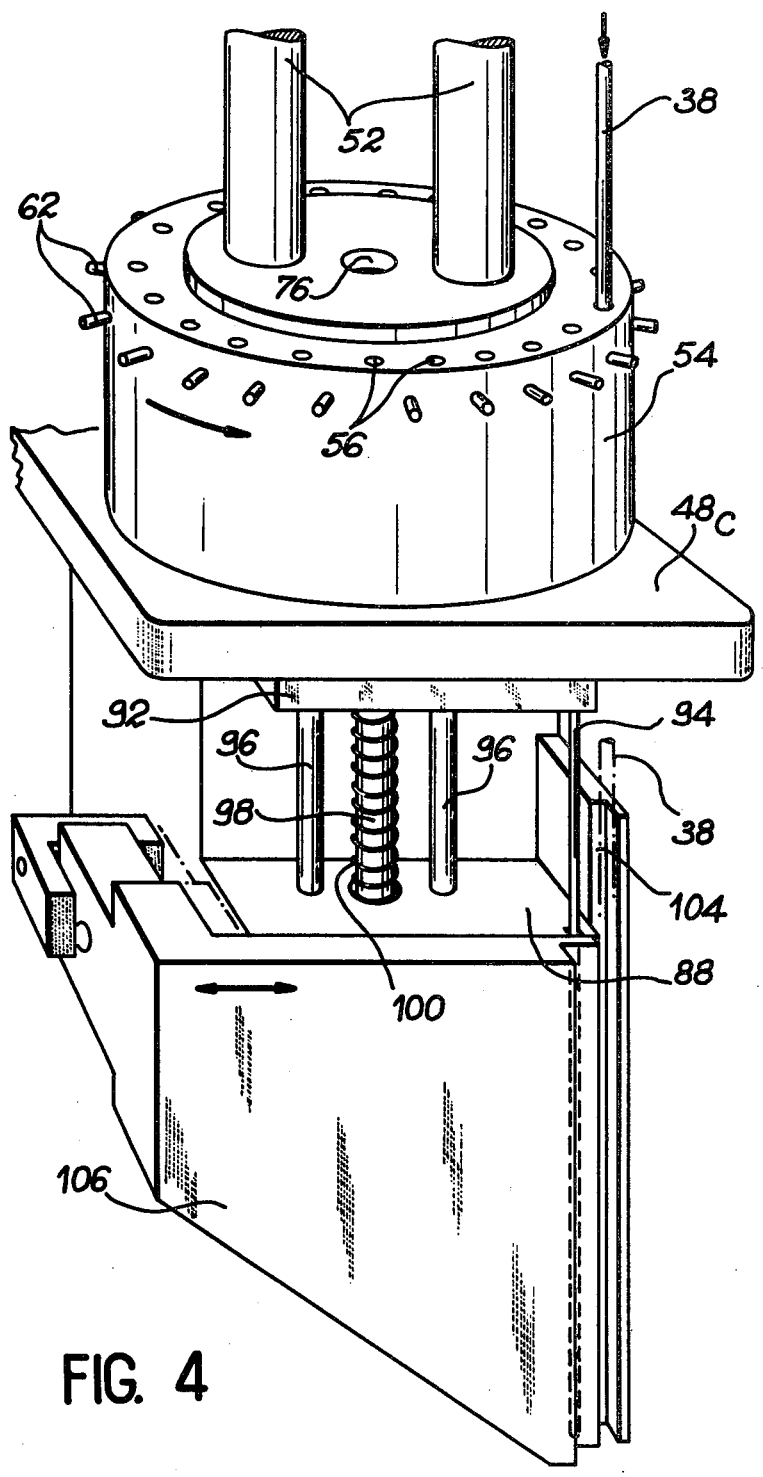
FIG. 4 a perspective view showing the lower end of the working head of the machine according to the invention.
Figure 5:
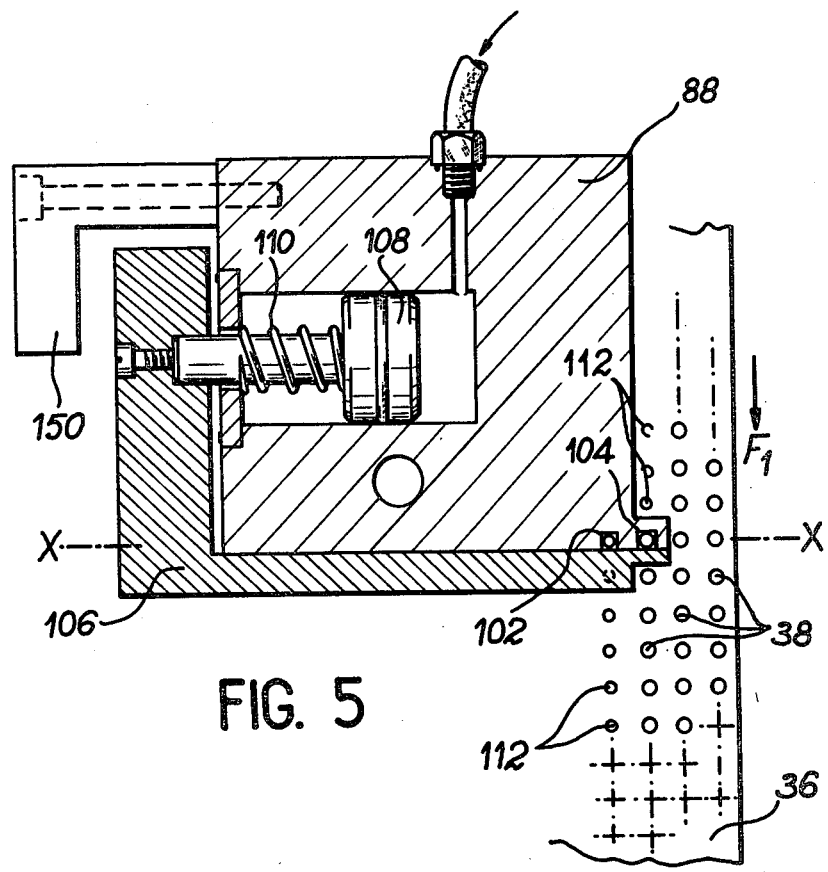
FIG. 5 a plan view in section along line V—V of FIG. 2 showing the operation of the door serving to guide the points when they are inserted in the mandrel.
Figure 6:
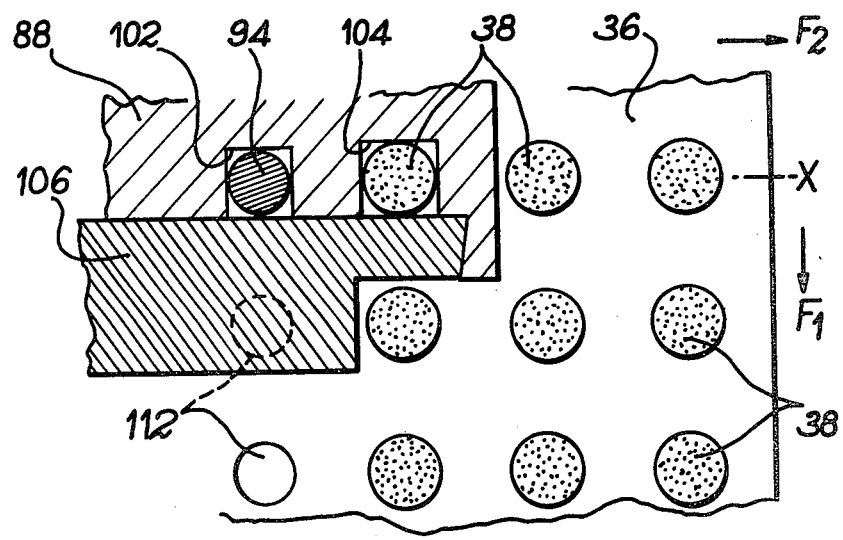
FIG. 6 a view comparable to that of FIG. 5 showing on a larger scale the guidance of the centre punch making the preliminary perforations on the mandrel and the guidance of the points during their insertion.

To permit mandrel 36 to rotate after the insertion of a point, the guidance of the point which has just been inserted along guide 104 must be momentarily interrupted during the rotation of the mandrel. To this end, FIGS. 4 to 6 show that the guidance hole 104 for the points to be inserted is formed level with the rear end of guidance part 88 with respect to the mandrel rotation direction indicated by arrow $F_1$ in the drawings. Moreover, the rear edge of hole 104 is formed on a sliding door 106, which opens just prior to the rotation of the mandrel in the direction of arrow $F_1$. As is in particular shown by FIG. 5, door 106 moves parallel to the axis of the mandrel under the action of a pneumatic jack 108 carried by guidance part 88. A spring 110 normally acts between part 88 and door 106 to maintain the latter in the closed position. The stroke of door 106 is limited by an abutment 150 fixed to part 88.

A description will now be given of the operation of the machine described hereinbefore with reference to all the drawings.

As has been stated hereinbefore, the complete surface of mandrel 36 moves beneath the working head 40 as a result of a stepwise displacement, which is associated in rotation and translation and which is transmitted to the mandrel by motors 32 and 22. Between each of these displacements, operating head 40 is operated to simultaneously carry out two operations in accordance with the present invention. The first of these operations consists of pre-perforating the mandrel by means of punch 94, whilst the second operation consists of inserting a point 38 in the perforation made during the preceding rotation by the punch, when the distance separating the holes 102 and 104 is equal to the distance separating two consecutive points of the same row.

Figures 3A, 3B:
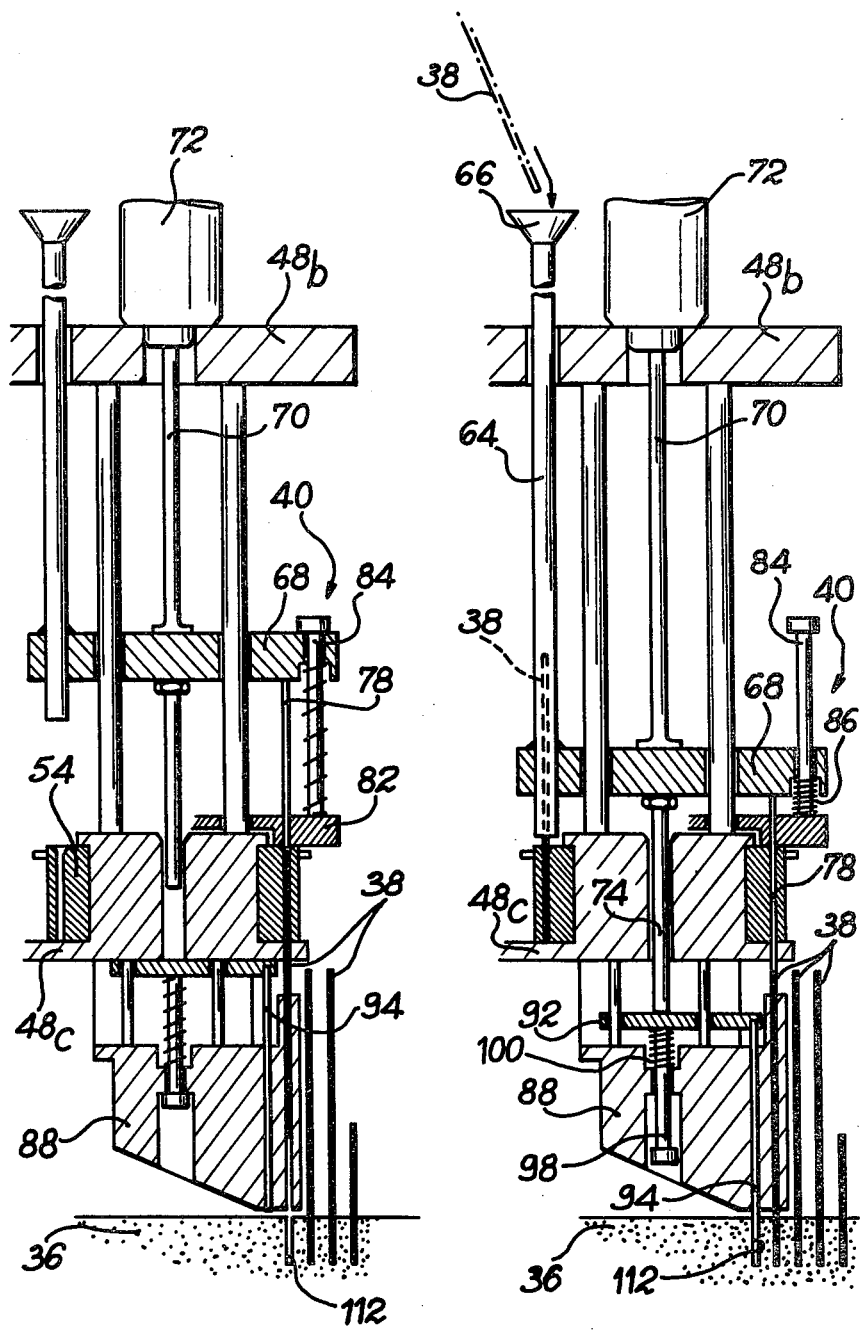
FIGS. 3a and 3b, sectional views comparable to FIG. 2 representing the working head in two positions for operating the machine according to the invention.

More specifically, the operation of working head 40 firstly leads to the downward movement of plate 68 under the action of jack 72. Initially and as illustrated in FIG. 3a, this downward movement makes it possible for rod 78 carried by plate 68 to insert the facing point 38 into hole 80 formed in branch 48c, then into the guidance hole 104 of part 88. During this first movement phase, the end of rod 78 acting on the point is guided by means of plate 82. When the latter abuts against drum 54, the latter guide rod 78 and spring 86 compresses in the manner illustrated in FIG. 3b. When the spring is completely compressed, the corresponding point is inserted in the facing perforation 112 made beforehand in the mandrel. It should be noted that during this insertion, the point is perfectly guided and positioned by hole 104 formed in guidance part 88.

During the second downward movement phase of plate 68 described with reference to FIG. 3b, rod 74 traverses hole 76 and bears by its lower end against plate 92. In this way, it draws the latter downwards in opposition to spring 100. The effect of this displacement of plate 92 is to make punch 94 project from part 88 and insert it in mandrel 36. Thus, a perforation 112 is made in the mandrel. Preferably, the diameter of the perforation is substantially equal to the diameter of the point to be inserted and its depth slightly exceeds the length of the portion of the points which is to be inserted in the mandrel. According to the invention, this pre-perforation makes it possible to subsequently ensure a very precise positioning and guidance of the points 38. Moreover, the simultaneous formation of the pre-perforations 112 and the actual insertion of points 38 in said perforations by means of the single working head 40 makes it possible to form these perforations exactly at the location where the points have to be subsequently inserted. It is therefore possible to insert points of greater length without preventing the subsequent winding and weaving operations in connection with the mandrel.

Finally, simultaneously with the two previously described operations, the arrival of plate 68 in the low position shown in FIG. 3b also makes it possible to ensure that drum 54 is supplied with points.

Thus, the downward movement of plate 68 brings the lower end of tube 64 into the vicinity of the drum, which makes it possible to easily introduce a point 38 into the corresponding hole 66 by at this moment dropping a point through tube 64, in the manner diagrammatically illustrated in FIG. 3b. The timing for the supply of the points can be brought about by any known means controlled by an automatic device.

When these three operations have been performed, jack 72 raises the members forming the working head 40 to a wait position shown in FIG. 2. The rotation of mandrel 36 in the direction of arrow $F_1$ under the action of motor 32 and, if necessary, its forward movement in the direction of arrow $F_2$ (FIGS. 1, 2, 5 and 6) under the action of motor 22 can then be controlled in such a way as to bring the working head 40 level with its following working position. However, these movements must be preceded by an opening of door 106 under the action of jack 108 in order that the point 38 which has just been inserted can be freed from guidance hole 104.

To ensure that during its following descent, rod 78 finds a point 38 to be inserted through guidance hole 104, the operations of motors 22 and 32 are accompanied by an operation of jack 58 making it possible, by means of system 60 and its pin 62, to control the rotation of drum 54 in order to bring a point 38 in front of rod 78 and an empty hole 56 in front of tube 63.

Obviously, the invention is not limited to the embodiment described hereinbefore and in fact covers all variants thereof. Thus, it has been stated that the points are preferably inserted either helically or in accordance with equidistant circles. In the same way, the means making it possible to actuate the punch and insert the pin can differ from those described without passing beyond the scope of the invention. Moreover, the mandrel is not necessarily cylindrical and can have any random revolution shape. In this case, the displacement of the mandrel parallel to its axis under the action of motor 22 can be accompanied by a displacement of the working head perpendicular to the closest mandrel generatrix. The mandrel can also have a previously perforated, hard outer layer.

In view of the means installed and the operational flexibility of the electronic controls, it is possible to modify the orientation of the preferred, axial and circumferential generatrixes by acting on the number of steps performed by the stepping motors.

The procedures defined are compatible with the processes for the pre-perforation of the two-layer mandrel and a deferred insertion.

For this purpose, it is merely necessary to have a conventional mechanical perforating head and to replace said means by the insertion head described hereinbefore.

Finally, within the scope of single-part production or mass-production, it is possible to conceive an optimization of this head able to pre-perforate several holes simultaneously and insert several points simultaneously.

What is claimed is:

1. A process for the insertion of points to a supporting mandrel made at least in part form from a material able to receive the points by direct insertion under pressure in order to form rows of points aligned in accordance with the generatrixes of the mandrel, wherein it comprises rotating step by step the supporting mandrel, simultaneously making by means of a single working head a perforation for receiving a point and the insertion of a point in a perforation made beforehand in the same row and producing a given relative displacement parallel to the closet generatrix of the mandrel between the working head and the mandrel, at least once every complete revolution of the mandrel.

2. A process according to claim 1, wherein a mandrel is used, which has an outer layer made from a hard material filled with the material for receiving the points and wherein the mandrel is perforated beforehand at least with respect to said outer layer.

3. A process according to claims 1 or 2, wherein the perforations are made over a depth at least equal to the length of that part of the points to be inserted in the mandrel.

4. A process according to claim 1, wherein the perforations are made with a diameter substantially equal to that of the points.

* * * * *